(12) United States Patent
Beasley et al.

(10) Patent No.: US 6,246,675 B1
(45) Date of Patent: *Jun. 12, 2001

(54) CDMA CORDLESS TELEPHONE SYSTEM AND METHOD OF OPERATION THEREOF

(76) Inventors: Andrew Beasley, P.O. Box 145, DeRoche, British Columbia (CA), V0M 1G0; Rafeh A. Hulays, 18 - 1455 West 15th Avenue, Vancouver, British Columbia (CA), V6H 1S4; Dean D. Schebel, 1401 - 3970 Carrigan Court, Burnaby, British Columbia (CA), V3N 4S5

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/748,955

(22) Filed: Nov. 13, 1996

Related U.S. Application Data

(60) Provisional application No. 60/006,694, filed on Nov. 14, 1995.

(51) Int. Cl.[7] .................................................. H04B 7/216
(52) U.S. Cl. ............................................ 370/342; 455/410
(58) Field of Search ...................................... 370/338, 335, 370/342, 200; 455/410, 411, 433, 560, 561

(56) References Cited

U.S. PATENT DOCUMENTS

| 5,103,459 | | 4/1992 | Gilhousen et al. ...................... 375/1 |
| 5,228,054 | | 7/1993 | Rueth et al. .............................. 375/1 |
| 5,309,474 | | 5/1994 | Gilhousen et al. ...................... 375/1 |
| 5,594,782 | * | 1/1997 | Zicker et al. .......................... 379/63 |
| 5,678,177 | * | 10/1997 | Beasley .................................. 455/16 |
| 5,715,297 | * | 2/1998 | Wiedeman .............................. 379/60 |
| 5,745,850 | * | 4/1998 | Aldermeshian et al. ............ 455/417 |
| 5,920,817 | * | 7/1999 | Umeda et al. ........................ 455/437 |

FOREIGN PATENT DOCUMENTS 2059370    7/1992   (CA) .

* cited by examiner

*Primary Examiner*—Valencia Martin-Wallace
*Assistant Examiner*—Kim T. Nguyen (57) ABSTRACT

In a code division multiple access (CDMA) cordless telephone system, CDMA telephone signals are exchanged between a basestation and an operating mobile cordless telephone handset. An upstream signal transmitted by the operating handset is detected at a detection location remote from the basestation by a signal recognition unit, which processes the detected upstream signal to recognize whether the handset is authorized, in which case an identification signal identifying the operating handset as being at the location and as being authorized is transmitted through a signal conduit to the basestation.

14 Claims, 11 Drawing Sheets

CDMA CORDLESS TELEPHONE SYSTEM AND METHOD OF OPERATION THEREOF

This application claims benefit to U.S. provisional application Ser. No. 60/006,694, filed Nov. 14, 1995.

BACKGROUND OF THE INVENTION

1. Field of the Invention

The present invention relates to code divisional multiple access (CDMA) cordless telephone systems and methods of operating such systems and is useful in particular for mobile CDMA telephone systems in which transmit and receive signals are exchanged, as radio signals or through a signal conduit, between a basestation, connected to a public switched telephone network, and a CDMA mobile telephone cordless handset. The signal conduit may, for example, comprise a co-axial cable or an optical fibre cable in a cable television (CATV) plant, and the CDMA telephone system may, for example, be an IS-95 or a 1.9 Ghz PCS CDMA system.

2. Description of the Related Art

It is known to provide telephone communication between a mobile cordless telephone handset and a basestation interfacing to a public switched telephone network, and to transmit CDMA transmit signals as wide area wireless signals to the handset. The mobile handset, timing is slaved to that of the transmit signals, and sends radio signals to the basestation for conversion and connection to the public switched telephone network. Such a system is commonly known as a macrocell system.

It is also well known to exchange signals with the mobile handset as radio signals between the handset and one or more RF repeaters in the form of remote antenna drivers (RAD's) through a CATV plant and a remote antenna signal processor (RASP) connected to the basestation. The use of RAD's can be arranged to provide a wide area (i.e. macrocell) service or to permit a plurality of small area wireless coverage zones, commonly referred to as microcells.

Prior art RAD-RASP technology connects the basestation to the RASP, and the RAD to the mobile handset, via a series of heterodyne operations. Thus, the basestation transmit signal is heterodyned to a frequency acceptable to the CATV plant by the RASP, and the RAD heterodynes the CATV transmit frequency to the correct radio frequency, etc.

RAD-RASP systems which perform identical heterodyne operations and which interconnect to the same basestation perform a simulcast transmission and reception. Consequently, they operate to form a macrocell. Microcells may be formed by using a lesser number of RAD's in the simulcast.

In prior art RAD-RASP systems, the location of the mobile handset can be determined only to the level of the cell. Therefore, microcells provide a relatively good resolution of the geographic location of the mobile handset.

Determination of the mobile handset may often be desirable. For example, it permits a wireless telephony operator to offer different billing rates for "in-home" and "out of home" usage of the mobile handset. However, in prior art RAD-RASP systems, this requires a large bandwidth on the CATV plant, since the microcells are distinguished from one another by heterodyning to different CATV transport frequencies.

Prior art RAD-RASP systems are described in U.S. Pat. Nos. 5,390,235 and 5,377,255, the disclosures of which are herein incorporated by reference.

BRIEF SUMMARY OF THE INVENTION

It is accordingly an object of the present invention to provide a CDMA system, and a method of operation thereof, which facilitate determination of the location of a mobile handset without utilizing an excessively increased CATV bandwidth.

According to the present invention, a CDMA mobile telephone system exchanges CDMA telephone signals between a basestation and an operating mobile cordless telephone handset, detecting an upstream signal transmitted from the operating handset at a detection location remote from the basestation, and processing the detected signal at the detection location to recognize the identity of the operating handset and to transmit, from the detection location to the basestation, an identification signal indicative of the recognition of the operating handset.

Preferably, a plurality of codes identifying a plurality of mobile cordless telephone handsets as being authorized to exchange signals with the basestation are stored at the detection location, and the processing of the upstream signal includes comparing the upstream signal with the codes to determine whether the operating handset is one of the authorized handsets.

Also, the signal quality the detected upstream signal may be monitored and the identification signal transmitted only when the detected upstream signal has a signal quality that exceeds a predetermined level.

If no authorized handset is detected, then a signal channel for transmission of the identification signal to the basestation may be squelched.

Thus, the present method may be incorporated in a RAD-RASP system to determine whether a valid or authorized handset is operating in the vicinity of a particular RAD and, if so, to send appropriate identification information through a CATV plant back to a RASP and, from the RASP, to the basestation for billing purposes. The recognition of the operating handset as an authorized handset may be used to control squelching not only of the upstream transmission, i.e. the transmission to the basestation, of the identification signal, but also of the entire upstream signal from the handset, unless the handset is recognized as being authorized.

Further, the recognition of the handset in the above-described manner can also be employed to interrupt (squelch) a downstream signal channel, through which transmit signals are transmitted from the basestation to the handset.

BRIEF DESCRIPTION OF THE DRAWINGS

The invention will be more readily understood from the following description of preferred embodiments thereof given, by way of example, with reference to the accompanying drawings, in which:

FIGS. 14 through 17 show flow charts illustrating call flows in the arrangements of FIGS. 3 and 4.

DESCRIPTION OF PRIOR ART

Figure 1:
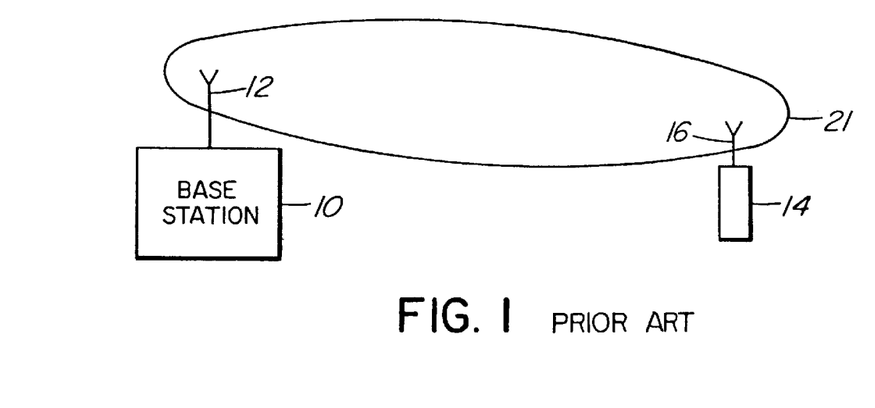
FIG. 1 shows a block diagram of a basestation and a mobile cordless handset forming a macrocell.
Figure 2:
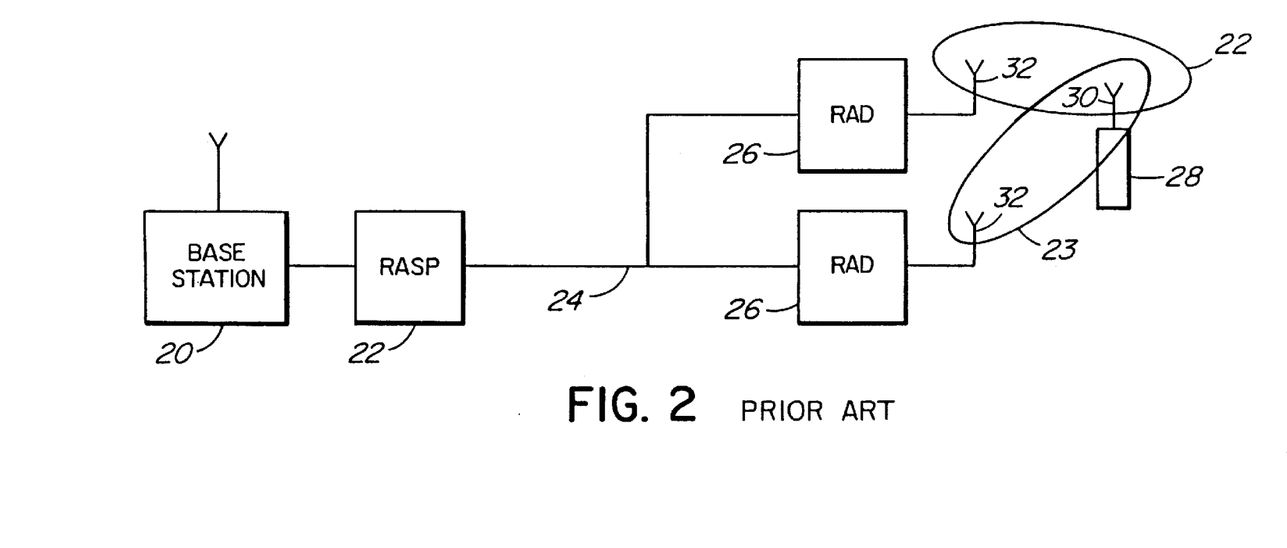
FIG. 2 shows a block diagram of a prior art RASP-RAD arrangement, forming microcells.

FIGS. 1 and 2 show, respectively, a prior art macrocell arrangement and a prior art microcell arrangement.

In FIG. 1, a basestation 10, which interfaces with a public switched telephone network (not shown), exchanges transmit and receive signals through its antenna 12 with a mobile cordless telephone handset 14, having an antenna 16, the basestation 10 having a coverage zone Z1 over which it can communicate with the handset 14. Typically, antenna 12 will be a 50 meter mast, making coverage zone Z1 many kilometers in diameter.

FIG. 2 shows a RASP-RAD system, in which a basestation 20, interfacing with a public switched telephone network (not shown), exchanges transmit and receive signals through a RASP 22 and through a CATV plant 24 with RADs 26. A mobile wireless telephone handset 28 receives, through its antenna 30, downstream or transmit signals, which are broadcast as radio signals from antennas 32 of the RADs 26, and transmits to the RADs 26 upstream or receive signals. The RADs 26 have overlapping coverage zones Z2 and Z3. Typically, the RADs 26 are mounted on telephone poles (e.g. 6 meters in height), and zones Z2 and Z3 are typically less than a kilometer in diameter.

The construction and operation of the RASP 22 and the RADs 26 are well known in the art and will therefore not be further described herein, except to mention briefly that the RASP 26 converts the downstream or transmit signals from the basestation 20 by heterodyning these signals to a frequency suitable for transmission through the CATV plant 24, which may comprise a co-axial cable or an optical fibre cable, and to heterodyne receive or upstream signals from the handset 28, while the RADs 26 serve to heterodyne the transmit or downstream signals to the correct radio transmission frequency for broadcasting to the handset 28 and, conversely, to heterodyne radio signals received from the handset 28 to a frequency suitable for transmission through the CATV plant 24 to the RASP 22.

It will be apparent that when the basestation 10 of FIG. 1 receives an upstream signal from the handset 14, the basestation 10 cannot determine the location of the handset 14 other than to recognize that the handset 14 is located somewhere within the coverage zone Z1 of the basestation 10.

For the arrangement shown in FIG. 2, the two microcells formed by the RADs 26 can be distinguished from one another by employing heterodyning to different CATV plant transport frequencies, but this requires a relatively large bandwidth on the CATV plant 24.

Figure 3:
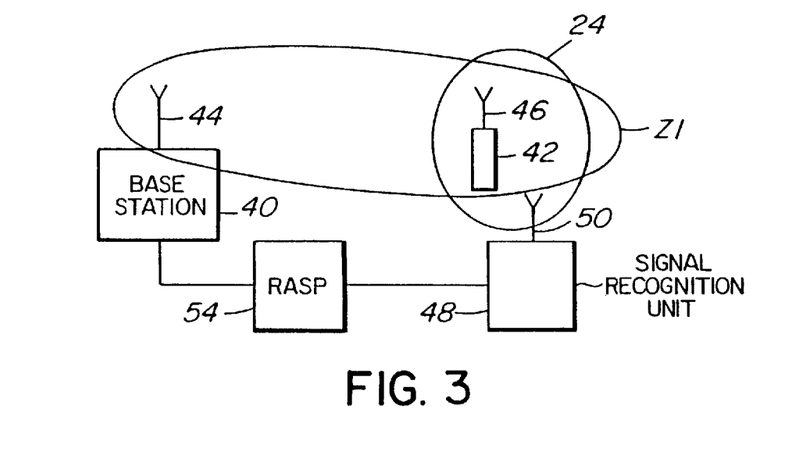
FIG. 3 shows a block diagram of a macrocell arrangement embodying the present invention.

FIG. 3 shows a first embodiment of the present invention, in which a basestation 40 exchanges downstream and upstream signals with a mobile handset 42 by a wireless link through their respective antennas 44 and 46.

In addition, a signal recognition unit 48, through its antenna 50, receives the upstream signal from the handset 42 over a coverage zone Z4. The signal recognition unit 48 then processes this upstream signal, as described in greater detail below, to determine whether the handset 42 is a valid or authorized handset transmitting in the vicinity of the signal recognition unit 48, in which case an identification signal is transmitted from the signal recognition unit 48 through a CATV plant 52 and a RASP 54 to the basestation 40.

While only one signal recognition unit 48 has been shown, it will be appreciated that, in practice, a plurality of such units may be employed and that, for example, one such unit may be provided in or near the dwelling of each customer.

As will be apparent from FIG. 3, zone Z1 (i.e. the basestation coverage zone) remains large, whereas the coverage zone Z4 is small.

Figure 4:
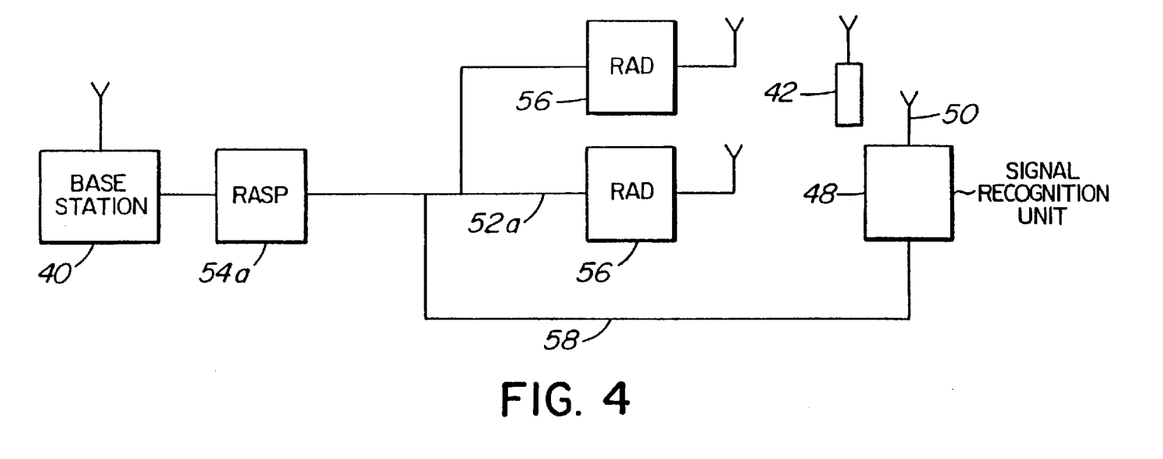
FIG. 4 shows a block diagram of a microcell arrangement embodying the present invention.

FIG. 4 shows a modification according to the present invention of the arrangement of FIG. 2. In the modification of FIG. 4, the basestation 40 is connected through RASP 54a and CATV plant 52a to two RADs 56, which, like the RADs 26 of FIG. 2, communicate with the handset 42 through a wireless links. Again the coverage zone of the antenna 50 is typically small.

Also, as shown in FIG. 4, the signal recognition unit 48 is provided to receive the upstream signals from the handset 42 and processes them, as briefly indicated above with reference to FIG. 3 and as described in greater detail below, to provide an identification signal through a signal channel comprising a co-axial cable 58 and the CATV plant 52a to the RASP 54a and the basestation 40.

Figure 5:
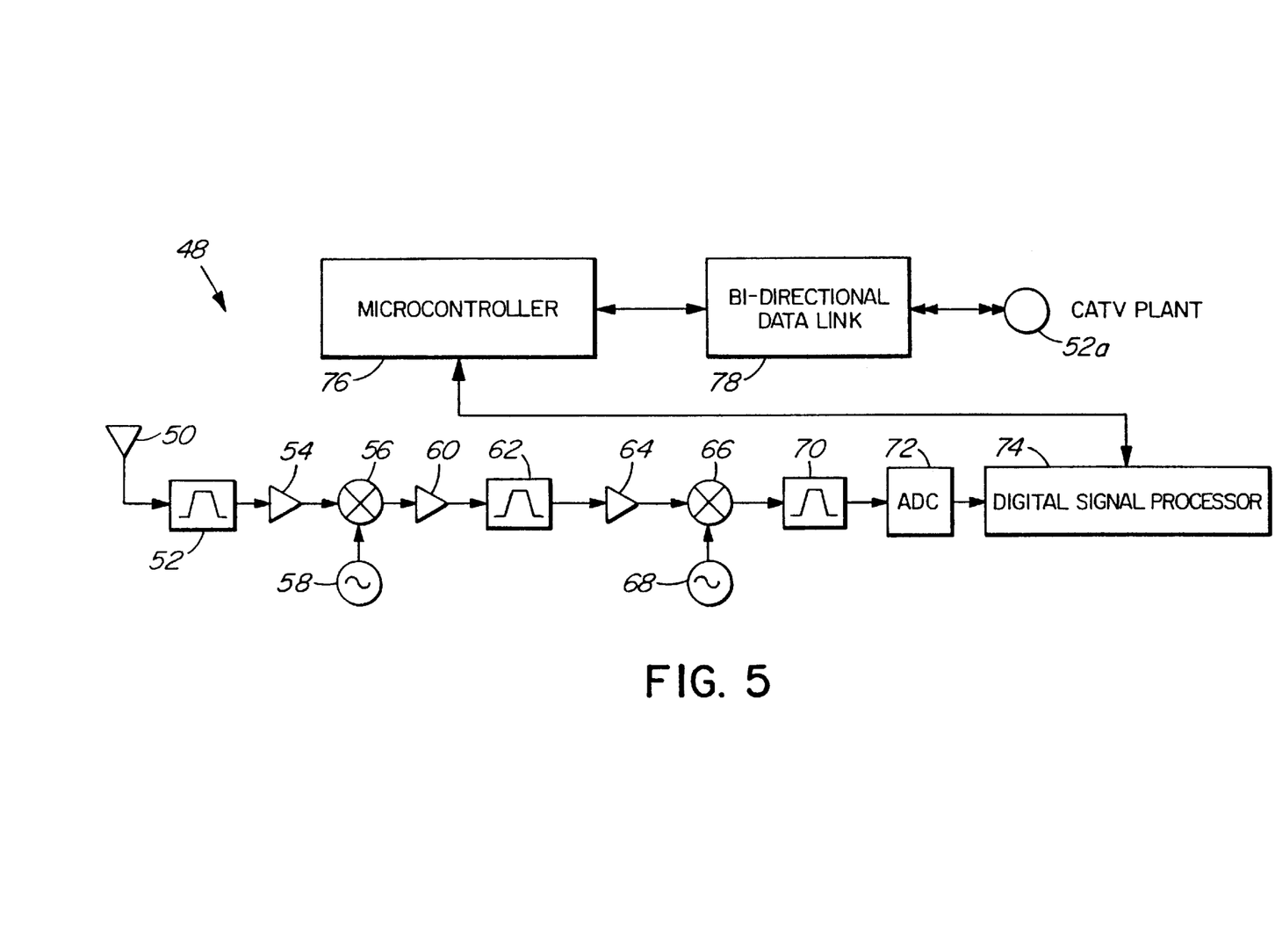
FIG. 5 shows a block diagram of a signal recognition unit forming part of the arrangements of FIGS. 3 and 4.

The signal recognition unit 48 of FIGS. 3 and 4 is shown in greater detail in FIG. 5, from which it can be seen that the handset upstream signal is received by the antenna 50, and the signal is then filtered by bandpass filter 52, amplified by amplifier 54, which is a low noise amplifier, and mixed to an intermediate frequency by means of a mixer 56 and an associated oscillator 58. The intermediate frequency signal is then further amplified by amplifier 60, filtered by saw filter 62, again amplified by amplifier 64 and then mixed down, to a final frequency, by a mixer 66 provided with an associated oscillator 68. The signal is then filtered by a narrow bandpass filter 70 and converted by an analog-to-digital converter 72 to a digital signal which is supplied to digital signal processor 74.

It would alternatively be possible to convert the output of the saw filter 62 to a digital signal, at the intermediate frequency, but this would involve additional costs associated with effecting the conversion at the higher frequency.

As will be apparent to those skilled in the art, the receiver or upstream CDMA channel is composed of access channels and reverse traffic channels. These channels share the same CDMA frequency assigned using direct-sequence CDMA techniques. Each traffic channel is identified by a distinct traffic channel long code sequence and each access channel is identified by a distinct access channel long code sequence.

Modulation for the reverse CDMA is a 64-ary orthogonal modulation. One of the 64 possible modulation symbols is transmitted for each six repeated code symbols. The 64-ary waveforms are generated using Walsh functions.

Direct sequence spreading, the reverse traffic channel and access channel are spread in quadrature. The sequences for this spreading are zero-offset and I and Q pilot PN sequences. These sequences are periodic with a periodic of $2^{15}$ chips.

The handset receives its timing and long code state information form a sync channel transmitted by the basestation. This is an encoded, interleaved, spread, and modulated spread spectrum signal that is used by personal stations (handsets) operating within the coverage area of the basestation to acquire initial time synchronization. The sync channel information package includes (among others) the Pilot PN sequence offset index, long code state and the system time, which is provided to the signal recognition unit 48 through the CATV plant by the RASP 54 or 54a or the basestation 40.

The access channel is used by the handset 42 to initiate communication with the basestation and to respond to paging channel messages. An access channel transmission is a coded, interleaved, and modulated spread spectrum signal. The access channels are uniquely identified by their long codes. Each PN chip of the long code is generated by the modulo-2 inner product of the 42-bit mask and the 42-bit state vector. The access channel long code mask is structured as:

| 41 | 33 | 32 | 28 | 27 | 25 | 24 | 9 | 8 | 0 |
|---|---|---|---|---|---|---|---|---|---|
| 110001111 | ACN | | PCN | | BASE_ID | | PILOT_PN | | | where:

ACN—Access Channel Number
PCN—Paging Channel Number
BASE_ID—Basestation identification
PILOT_PN—PN offset for the Forward CDMA Channel The reverse traffic channel is used for transmission of user and signalling information to the basestation during a call. The reverse traffic channel is uniquely identified by its long code. Each PN chip of the long code is generated by the modulo-2 inner product of the 42-bit mask and the 42-bit mask and the 42-bit vector. The public long code mask is structured as:

| 41 | 33 | 32 | 0 |
|---|---|---|---|
| 1100011000 | | Permutated ESN_S | | where ESN_S is the first 32 bits of the electronic serial number of the handset.

The digital signal processor 74 determines whether the upstream signal is a signal with a valid code, corresponding to the identification of the authorized handset 42. The authorised handset codes can either be programmed remotely via the co-axial cable 58, by the RASP 54 or 54a, by the basestation 40 or locally at the signal recognition unit 48 or an authorised access channel which is composed of ACN, PCN, BASE_ID, and PILOT_PN codes, some or all of which will be supplied to the signal recognition unit 48 via the coaxial cable 58 from the RASP 54a, or the basestation 40. Authorised 0 codes could be added or removed at will. If a valid code (valid traffic or access channel) is present in the detected zone with a pre-determined signal strength, the digital signal processor 74 instructs a microcontroller 76 to transmit an identification signal, representing the identification of the authorized handset 24, to the basestation 40 through a bi-directional data link 78, the cable 58 and the CATV plant 52 or 52a.

Figure 6:
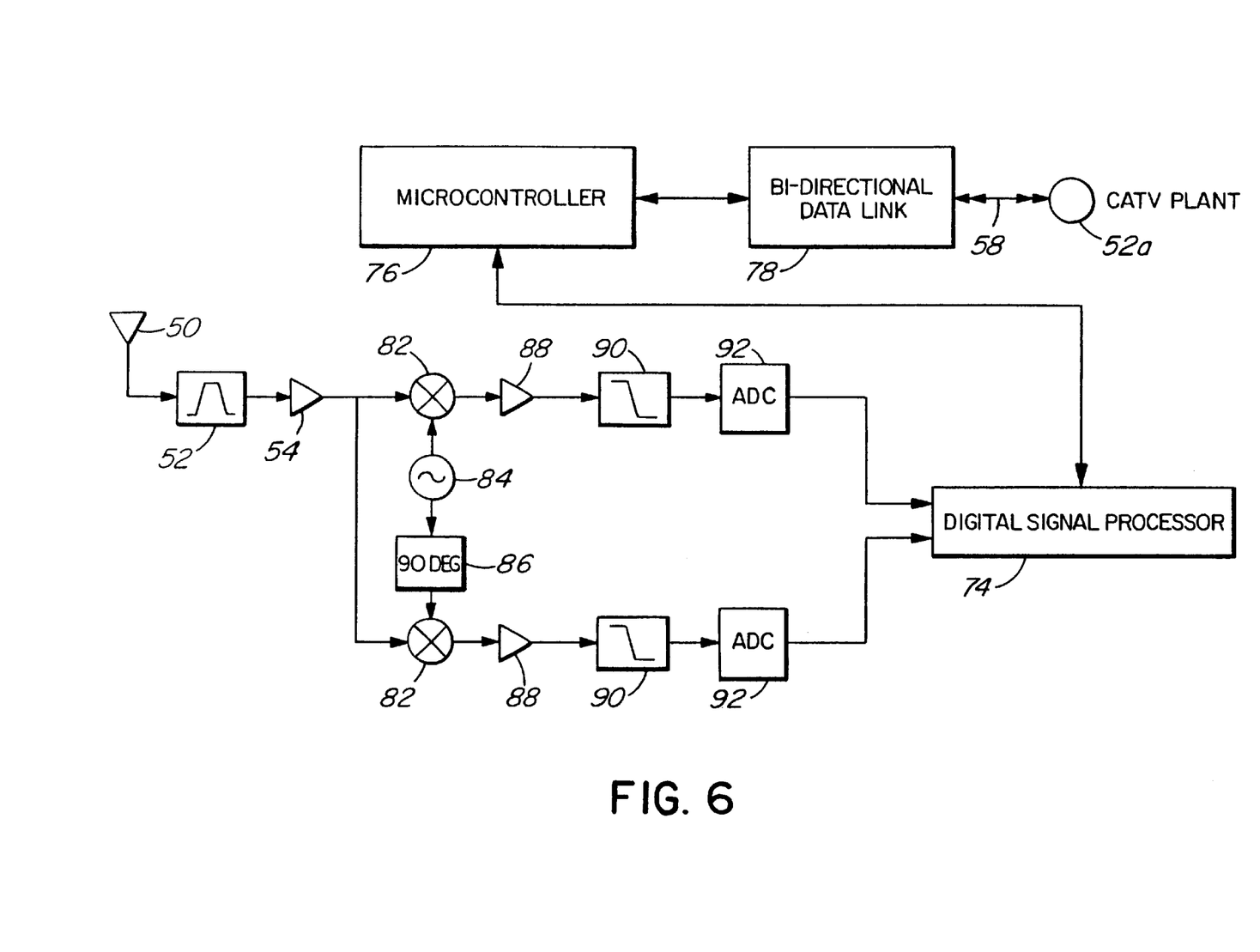
FIG. 6 shows a modification of the signal recognition unit of FIG. 5.

FIG. 6 shows a modification, indicated by reference numeral 49, of the signal recognition unit 48 of FIG. 5. In the modification of FIG. 6, the detected upstream signal is again received by the antenna 50, filtered by the bandpass filter 52 and amplified by the amplifier 54. The output of the amplifier 54 is split and down-converted, by mixers 80 and 82, with an associated oscillator 84 and a 90° phase shifter, directly to a baseband frequency, thus avoiding any need for saw filters, which are expensive. The baseband signals are amplified by amplifiers 88, filtered by low pass filters 89 and converted to digital signals by analog-to-digital converters 91, before being supplied to the digital signal processor.

Figure 7:
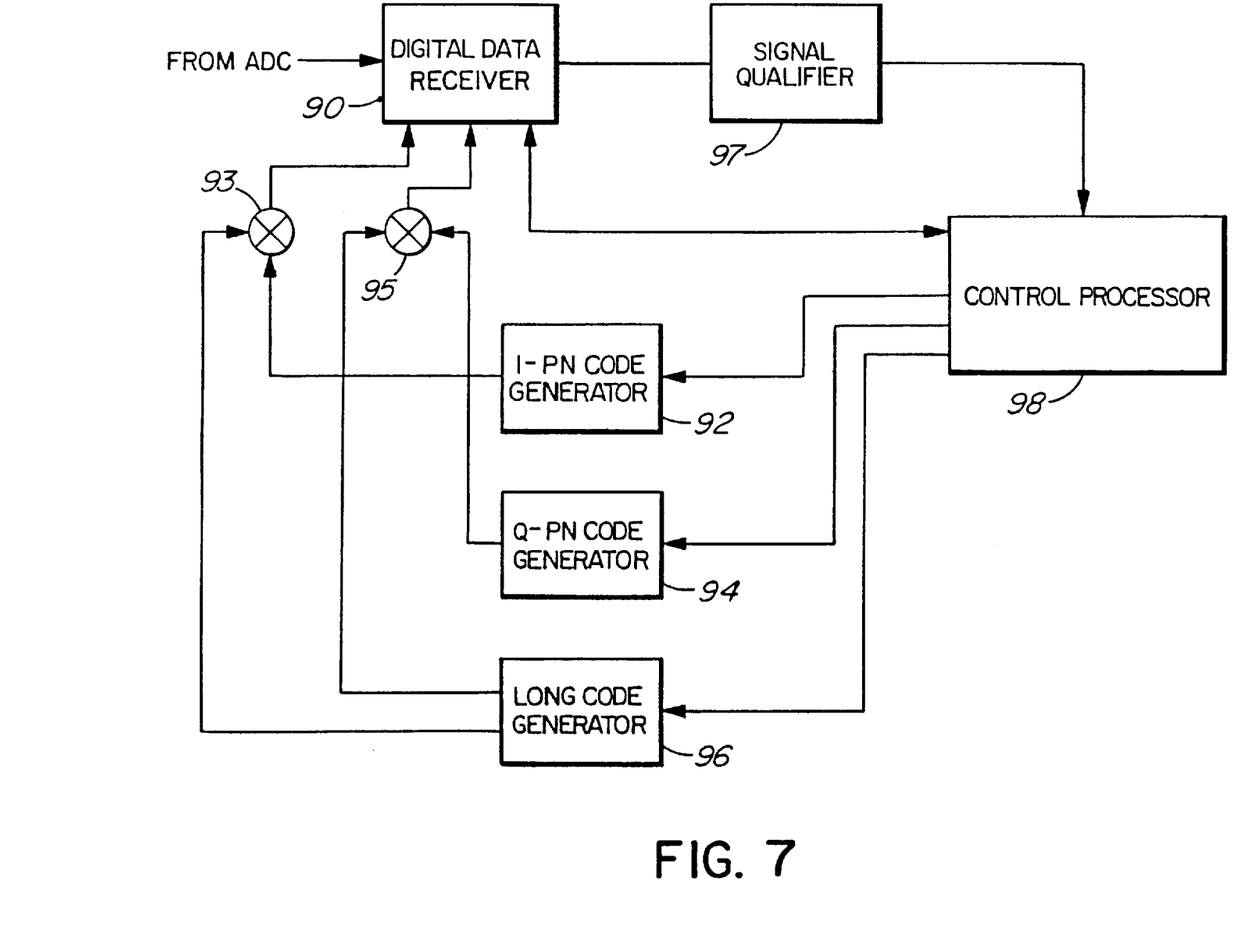
FIG. 7 shows a block diagram of a digital signal processor forming part of the units of FIGS. 5 and 6.

FIG. 7 shows a block diagram of the digital signal processor 74 of FIGS. 5 and 6. The analog-to-digital converters 91 of FIG. 6 can be treated as one by forming a single complex number from their two outputs. As shown in FIG. 7, the digital signal processor 74 comprises a digital receiver 90, an I-PN code generator 94, a Q-PN code generator and a long code generator 96, which are connected through mixers 93 and 95, which mix the long code with the I-PN code and the Q-PN code, respectively, to a control processor 98. The digital receiver 90 is similar to that disclosed in U.S. Pat. No. 5,103,459, the disclosure of which is incorporated herein by reference.

In the digital receiver 90 and signal qualifier 97, the signals input to the digital signal processor 74 are correlated with the PN codes from the code generators 92 and 94 and 96, which are generated by the code generators 92, 94 and 96, the states of which are supplied via the coaxial cable 58 by the RASP54 or 54a or the base station 40 and by an authorized user mask containing stored data representing the identifications of a plurality of authorized handsets. If the identity of an authorized user is detected with sufficient signal quality (e.g. signal strength), the control processor 98 acknowledges this authorized handset is within its local coverage zone, and informs the basestation via link 78 of FIGS. 5 and 6.

The signal qualifier 97 effects forward error correction, or a cyclical Rundsey check algorithm, which are well known in the art, and qualifies this signal as good or bad depending on the bit or frame error rate obtained. It would alternatively be possible to employ an FFT algorithm and a peak-to-noise algorithm to determine whether the peak signal is sufficiently higher than a noise floor, in which case an authorised signal is recognised as being present.

An improved signal-to-noise ratio may be obtained by performing the fast Hadamard transforms or by utilizing matched filters. The control processor 98 supplies the code generators 92, 94 and 96 with the stored code masks and with the generator state also handles synchronization procedures and decisions as to whether a valid authorized user, with an acceptable de-spread power, is present. This information is then relayed to the microcontroller 76.

Figure 8:
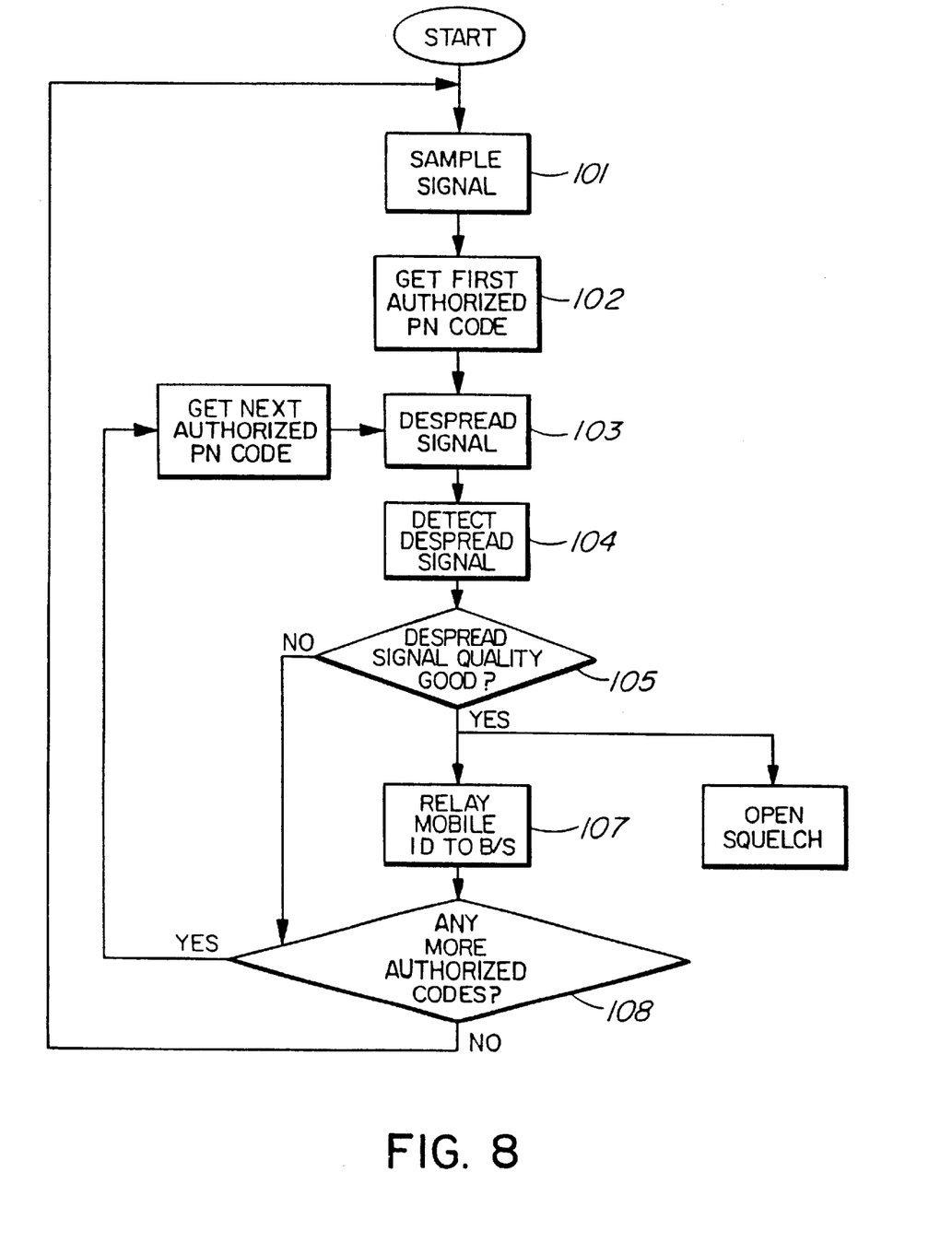
FIG. 8 shows a flowchart of the operation of the digital signal processor of FIG. 7.

FIG. 8 shows a decision flow chart illustrating the operation of the digital signal processor 74 for determining whether the handset 42 is an authorized handset and, if so, whether it is in the vicinity of the signal recognition unit 48. As will be apparent from the above, this flow chart employs signalling information supplied from the basestation 40 and the RASP 54 or 54a through the CATV plant 52 or 52a to the signal recognition unit 48, this signalling information including timing information, the long code state, and the base station identity. It may also include the access channel numbers and paging channel numbers.

In a first step 101, the signal recognition unit 48 samples the down converted input signal from the analog-to-digital converter 72 of FIG. 5 or the analog-to-digital converters 91 of FIG. 6. The first authorized PN code is obtained at step 102 and the sampled signal is despread in step 103, using the first authorized PN code. At step 104, the despread signal is detected, and at step 105 it is determined whether the despread signal is an authorized signal, i.e. originating from an authorized handset, by measuring the power of the despread signal or by decoding this signal.

At step 106, a decision is made as to whether this power is greater than a threshold value. If so, then at step 107, the microcontroller 76 relays the electronic serial number of the handset 42 to the RASP 54 or 54a and to the basestation 40 at step 107.

If, at step 108, it is determined that there is a further unused authorized code, then the detected signal sample is despread with the next authorized code, and the above-described procedure is repeated.

The repetition of this procedure is continued until the detected signal has been despread by all of the authorized codes. When this occurs, the input power from the antenna 50 is measured and, if a strong detected signal is present, the operation is repeated until the signal recognition unit 48 is powered down or ordered disabled from the RASP or the basestation 40. Note that in conventional CDMA systems, detection of power prior to de-spread, (as is performed at step 100 of FIG. 8), is very difficult because of the nature of the spread signal. In the case of the present embodiment, however, signal recognition unit 48 is physically so much closer to the mobile handset than to the basestation that detection is achieved.

Figure 9:
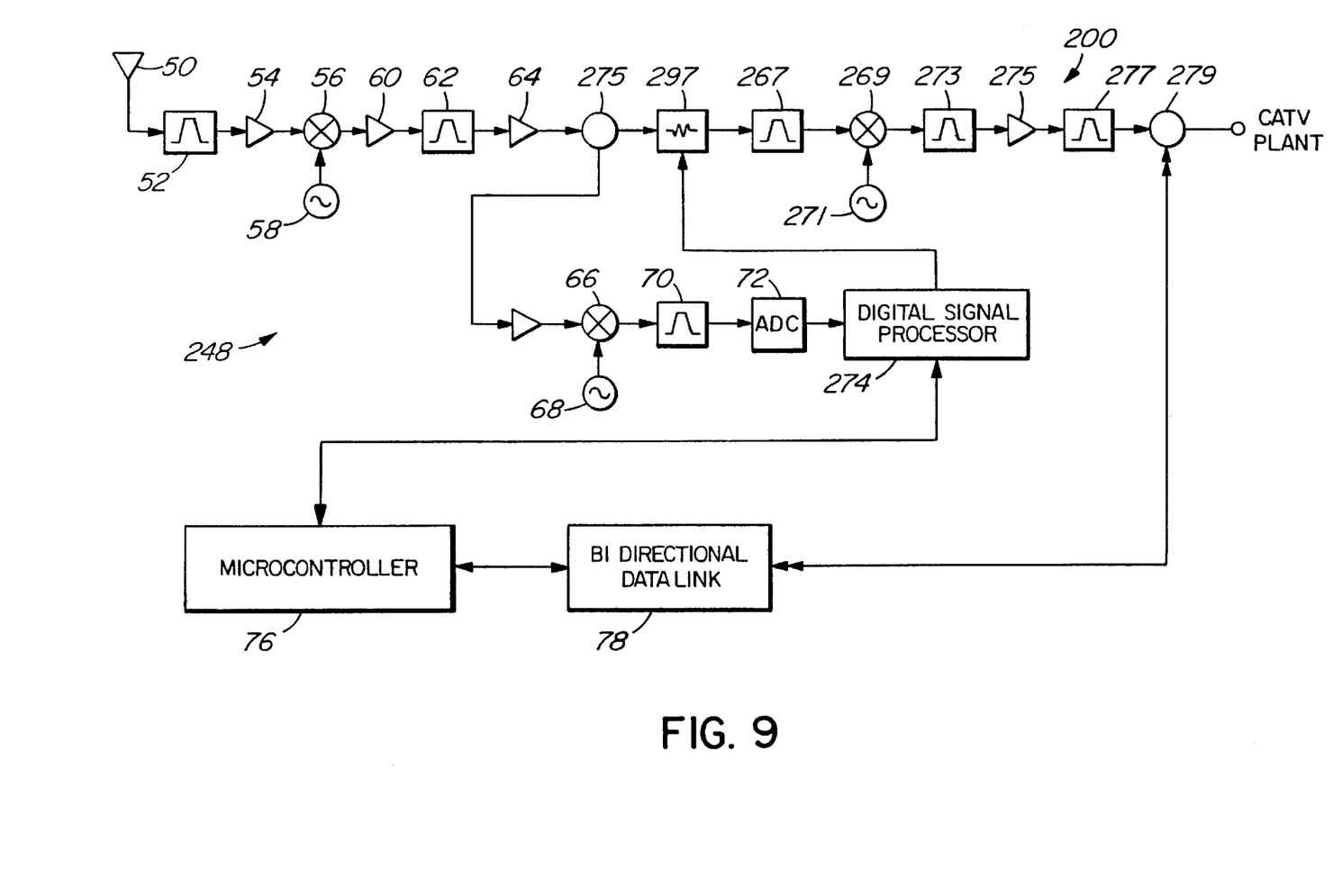
FIG. 9 shows a block diagram of a modified signal recognition unit.
Figure 10:
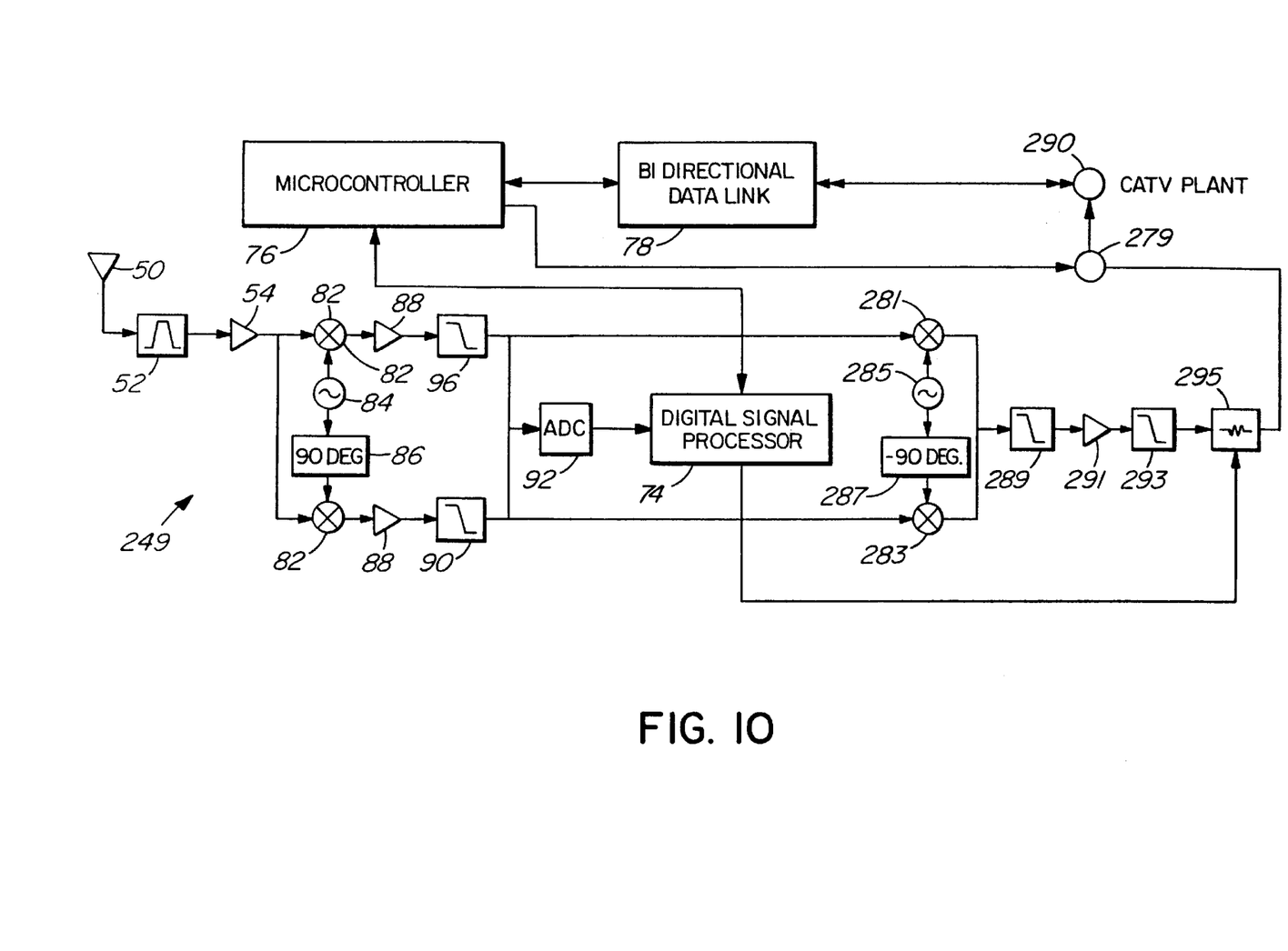
FIG. 10 shows a modification of the unit of FIG. 9.

FIGS. 9 and 10 show modifications of the signal recognition units of FIGS. 5 and 6, indicated generally by reference numerals 248 and 249, respectively. The units 248 and 249 function not only as signal recognition units, but also as RF repeaters for filtering, heterodyning and amplifying the upstream signal and passing it through the CATV plant to the basestation.

With this arrangement, a downstream signal is supplied from the basestation 40 to the handset 42 through a radio link between the antennas 44 and 46, whereas the upstream signal from the handset 42 is supplied, by a radio link between antennas 46 and 50, through the unit 248 or 249, acting as an upstream RF repeater, and through the CATV plant and the RASP to the basestation This allows a weak upstream signal from the handset 42 to be received by the unit 248 and 249 at an average power level which is higher, due to the proximity of the handset 42, than would be true for the handset signal if it were received directly by the basestation. Consequently, this arrangement can provide a better upstream signal quality, at the basestation, or an equivalent signal quality at a lower power, than would be possible for a direct upstream radio link between the handset 42 and the basestation.

As shown in FIG. 9, the unit 248 has an upstream RF repeater path, indicated generally by reference numeral 200, and the digital signal processor 274 in this case also controls a squelch 297 in the path 200 in such a manner that the squelch 297 is opened to allow the reverse CDMA channel from the handset 42 to be transmitted through the CATV plant only when the handset 42 has been identified as an authorized handset, or when valid reverse access channel is available in the manner described above. The unit also informs the base station 40 of the presence of an authorised handset.

For this purpose, the unit 248 includes a power splitter 275, which allows the output of the IF amplifier 65 to be processed by digital signal processor 274 as described above, and also to be passed through the upstream RF repeater path 200, comprising a saw filter 267, followed by a mixer 269 and an associated oscillator 271, which convert the detected signal to the upstream CATV plant band of frequencies, which is typically 5–40 MHZ. The upstream signal then passes through a bandpass filter 273, an amplifier 275 and another bandpass filter 277 before being combined at coupler 279 with the bi-directional data link 278 and placed on the CATV plant.

With this embodiment of the invention, it is necessary to open the squelch 297 whenever traffic from an authorized handset or valid access channel is detected. Since the handset ID is not embedded in the access channel mask, it is necessary to either a) extract the ID from the datastream or b) to open the squelch 297 whenever an access channel associated with the appropriate basestation and paging channel is present. Preferably, the squelch 297 is opened when any of the access channels is present. The squelch 297 will close when a predetermined time expires after the last authorized channel has been detected. The squelch 297 may also open upon request from the RASP or the basestation.

FIG. 10 shows a modification in the unit 248 of FIG. 9. In the modification shown in FIG. 10, in which components described above with reference to FIG. 5 have been indicated by the same reference numerals, and in a manner that will be apparent from the above description of FIG. 6, the down conversion is made to baseband rather than to an IF. In this case, the signals are then reconverted back to an upstream frequency through mixers 281 and 283, with an associated oscillator 285 and a —90° phase shifter 287, and are then recombined to recover the original information, and passed, in turn, through filter 289, amplifier and filter 293 and, under the control of squelch 295, are passed to the CATV plant.

The squelching, in this case, is effected at the final upstream frequency rather than at the baseband solely because, otherwise, two squelch circuits would be required at the baseband for the two 90° out-of-phase paths.

There will be some residual LO leakage at the reconstructed upstream signal from the second mixing, but this can be corrected by means of a notch filter (not shown) at the RASP. The reason that the notch filter is provided at the RASP rather than at the unit 248 or 249 is that there is only one RASP, whereas the unit 248 or 249 will normally be one of a plurality of such units. Also, it should be noted that notching a CDMA signal for a small portion of its bandwidth will have little adverse effect on the reconstructed data due to the nature of the spread spectrum signal.

Preferably, the units 248 or 249 will receive all necessary information for the access masks and the synchronization information through the CATV.

Figure 11:
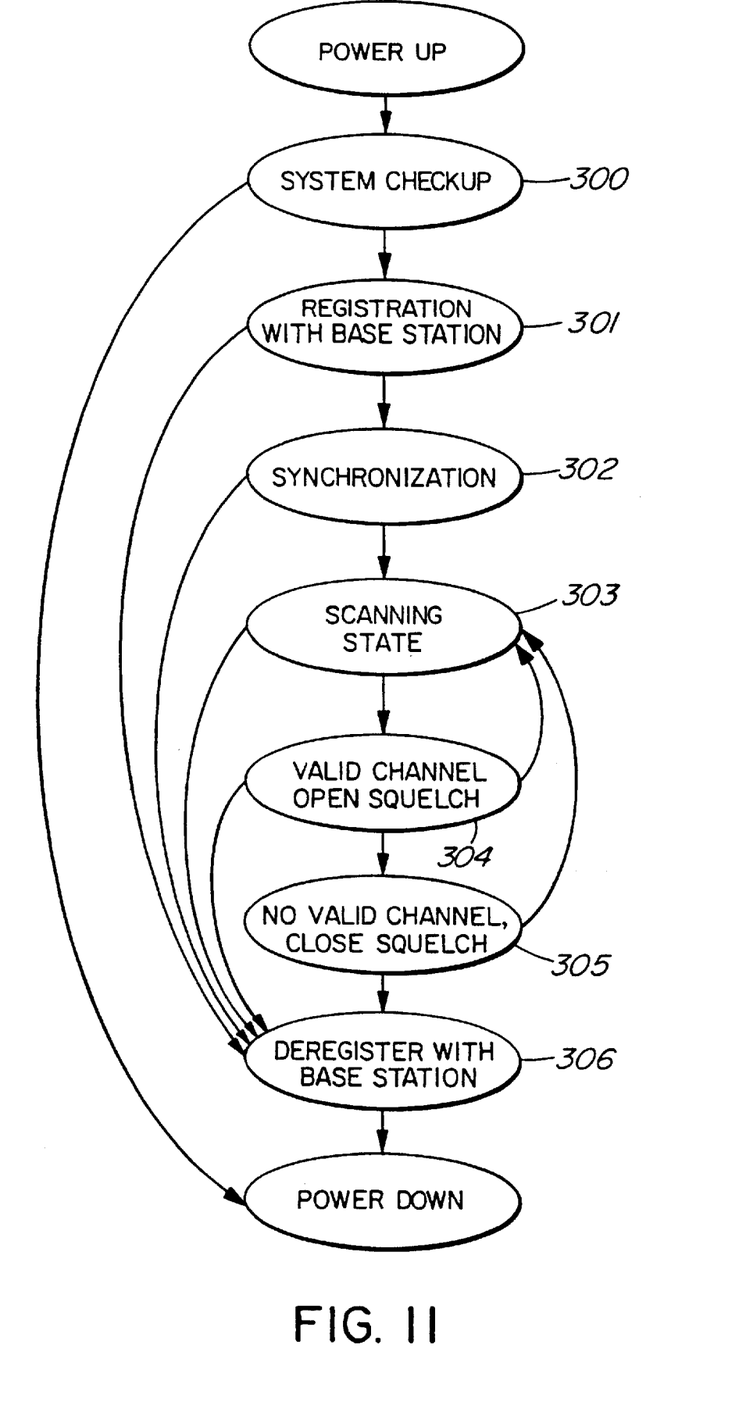
FIG. 11 shows a flow chart of the operation of the units of FIGS. 9 and 10.

FIG. 11 shows the algorithm for squelch call processing. The flow chart shown in FIG. 11 does not include error and error reporting procedures.

As shown in FIG. 11, once powered up, the unit 248 or 249 may carry out one or all of the following steps:

Step 300—System Checkup
Step 301—Registration with Basestation
    Send registration message to RASP or Basestation:
        Message Type
        ID of unit 248 or 249
        Status
        Authorized user list
    Receive registration Ack message from RASP or basestation:
        Message Type
        Basestation ID
        Authorized user list
        Status Step 302—Synchronization
   Receive sync message from RASP or basestation:
      Message type
      Time
      PN_ Offset
      State of long code
      Pilot channel numbers
   Send sync Ack message to RASP or basestation:
Step 303—Scanning State:
   Input signal despread by various codes
   Recycle through codes
Step 304—Squelch Open:
   Valid user detected
   If Traffic, send valid user message to RASP or basestation:
      Message type
      ID of unit 248 or 249
      Handset ID
   Receive Ack message from RASP or base station.
   Keep scanning (step 303)
Step 305—Squelch Closed:
   No valid channel detected
   Squelch closed after a period of time
   Keep scanning (step 303)
Step 306—Deregister with Basestation
   If power is shut down or the unit is commanded to shut down
   Send Deregistration message to RASP or basestation
      Message Type
      ID of unit 248 or 249
   Receive Ack message
   Obtain time delay between the RASP or base.

Figure 12:
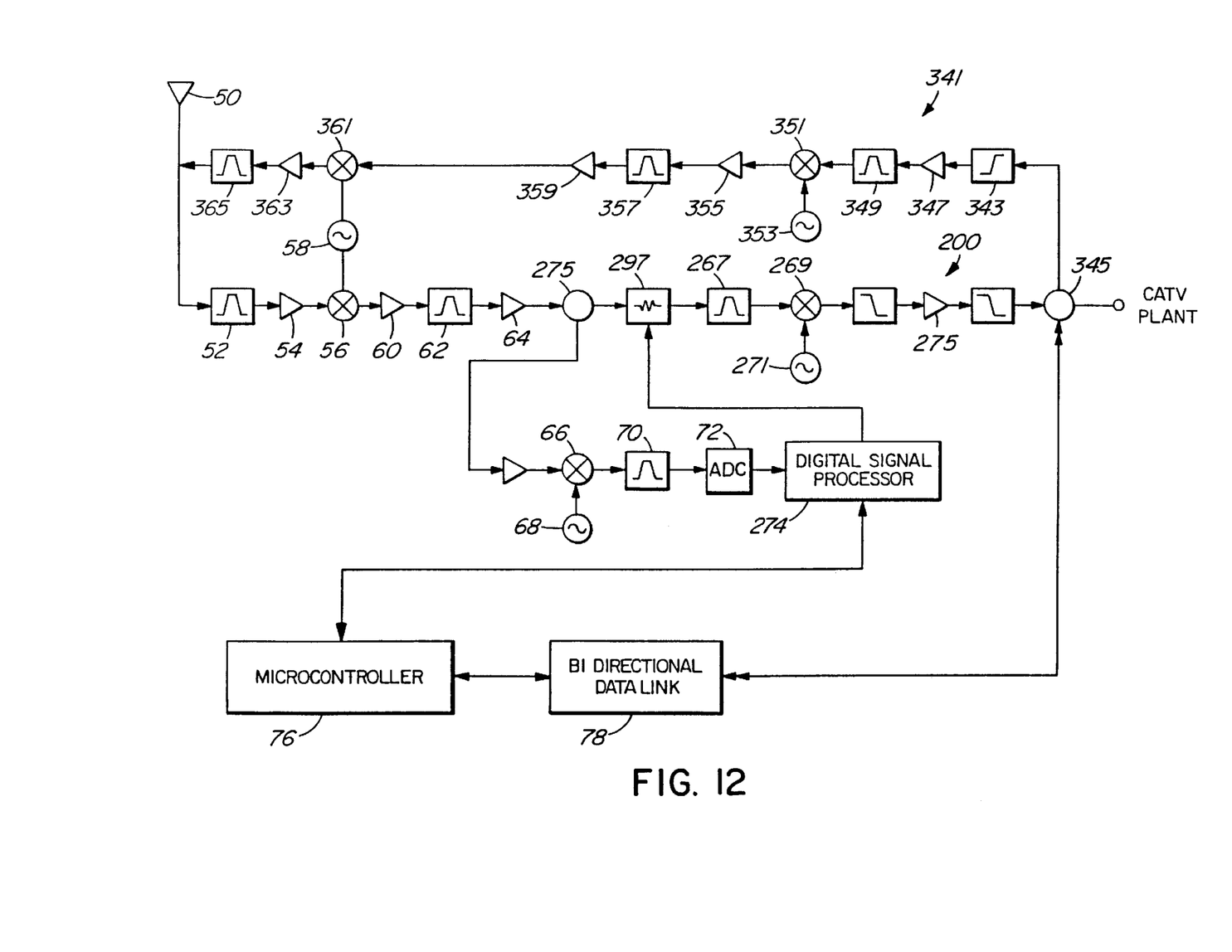
FIG. 12 shows a block diagram of a further modification of the signal recognition unit of FIG. 5.

FIGS. 12 shows a further modification according to the present invention, indicated generally by reference numerals 348, of the signal recognition unit 48 of FIG. 5.

In this case, the unit 348 operates as a signal recognition unit corresponding to the signal recognition unit 48 of FIG. 5 and, in addition, also serves as an RF repeater for exchanging both upstream and downstream signals with the handset 42.

As can be seen from FIG. 12, the CATV plant is additionally connected through a downstream RF repeater path indicated generally by reference numeral 341, which includes a high pass filter 343 connected to receive the downstream signal from the basestation through splitter/coupler 345, followed by an amplifier 347 and a band pass filter 349. Following the latter, a mixer 351, with an associated oscillator 353, is provided for mixing the signal to an intermediate frequency, afterwards the signal is amplified in an amplifier 355, again band pass filtered in a saw filter 357, amplified again by an amplifier 359 and passed to a mixer 361 associated with the oscillator 58, where the upstream or receive signal is mixed up to the original transmit frequency by the mixer 361. The signal then passes through a further amplifier 363 and a further band pass filter 365 before being passed to the antenna 50 for transmission to the handset 342.

In this embodiment, the transmit signal from the basestation is continuously broadcast from the antenna 50.

The embodiment of FIG. 12 is in effect a RAD supplemented by the signal recognition unit.

There exist two possible purposes for adding the signal recognition unit as shown in FIG. 12. The RAD with the supplemental signal recognition unit may be used to support authorized mobiles only, i.e. only authorized mobiles will open the squelch 297 and all other mobiles are unable to obtain service. The bi-directional data link 78 additionally allows the location to be defined even if there are a multiplicity of RADs operating. The RAD with the supplemented signal recognition unit is used to support all mobiles, and to provide location information in "authorized" mobiles, (e.g. for billing purposes). If this second purpose is required, the squelch element 297 will be permanently set to allow upstream signals by the digital signal processor 274, and the bi-directional data link 78 provides the location data.

This embodiment may be further modified by providing a squelch (not shown) in the downstream signal path 341 for squelching the downstream or transmit signal when no authorized operating handset has been detected. This downstream signal squelching is remotely controlled through the microcontroller 76 by the RASP or the base station.

Figure 13:
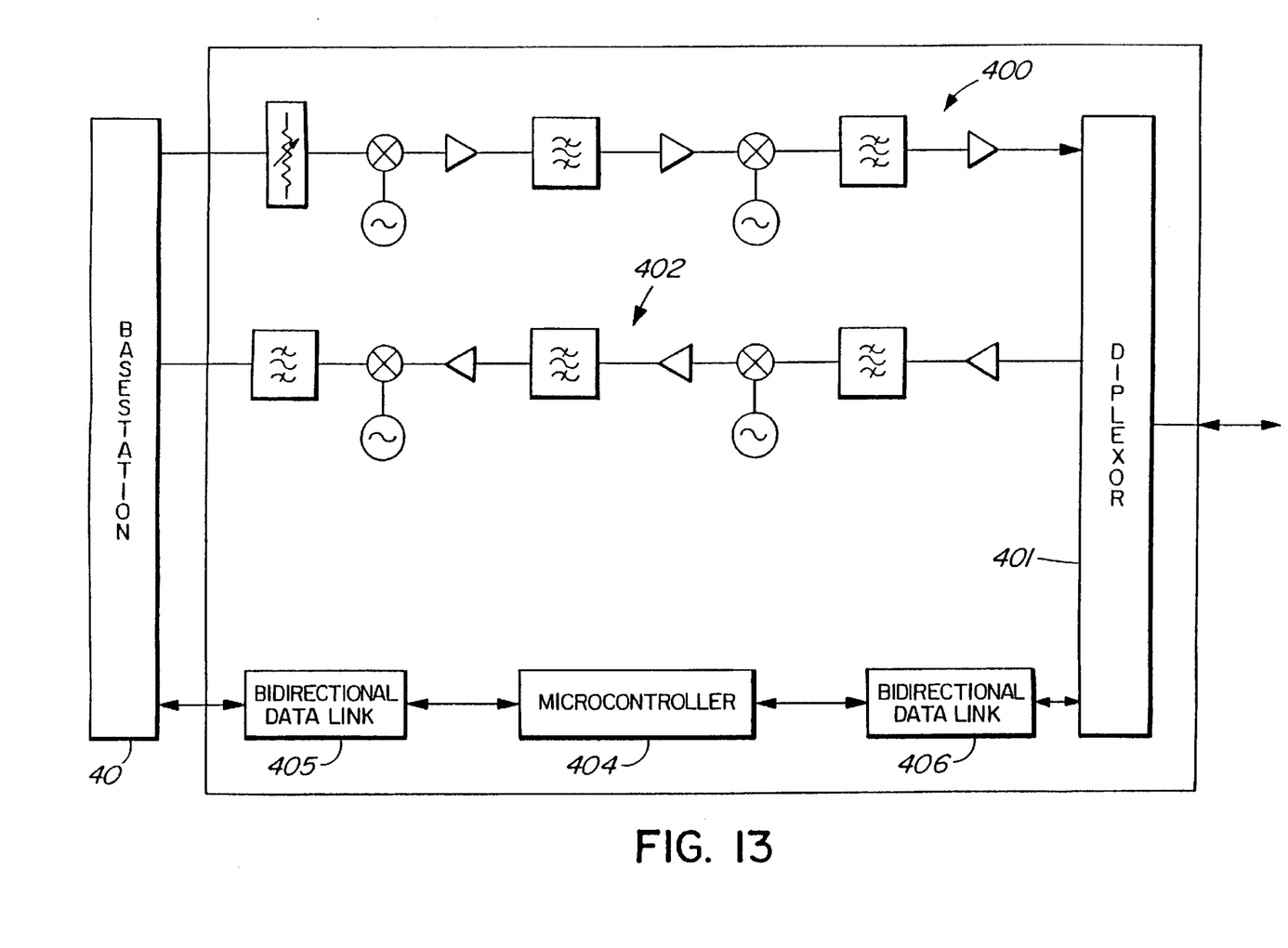
FIG. 13 shows a diagram of a component of the arrangement of FIG. 4.

FIG. 13 shows in greater detail components of the RASP 54a of FIG. 4. As shown in FIG. 13, the RASP 54a includes a downstream signal path indicated generally by reference number 40 for heterodyning the signals from the basestation 40 and connecting the heterodyned signals to a diplexor 401 for transmission as radio signals to the handset 42, and an upstream signal path indicated generally by reference number 402 for heterodyning upstream signals from the diplexor 401 and supplying them to the basestation 40. The components employed for this purpose in the signal paths 400 and 402 will be readily apparent to those skilled in the art from FIG. 13, and therefore, are not described in further detail.

In addition, the RASP 34a includes a microcontroller 404, connected through a bi-directional data link 405 to the basestation 40 and through a bi-directional data link 46 to the diplexor 54a.

In operation, the basestation 40 supplies the microcontroller 404 with the basestation address, the PN code states, the I-PN state, the Q-PN state, and the access and page channel numbers. The microcontroller 404, in turn, relays this information to the signal recognition unit 48.

Also, the microcontroller 404 relays basecommands, such as an enabling basestation signal or signals for adding or deleting authorised handset identifications, to the signal recognition unit 48.

In addition, the microcontroller 404 relays to the basestation the authorised handset identifications detected by the signal recognition unit 48.

Instead of employing the microcontroller 404 in the RASP 54a for this purpose, it is alternatively possible to employ a microcontroller in the basestation. The communication channel between the signal recognition unit 48 and the basestation can either be in the control channel between the RASP 54a and the RADs 56, or in a traffic channel or a different channel.

FIGS. 14 through 17 illustrate call flows between the handset 42 and the signal recognition 48 in different circumstances.

More particularly, FIG. 14 shows the progress of a call to or from an authorised user.

In a first phase, a user-initiated call is detected by the handset or a page message sends an origination or page response message to open an access channel, which is then authenticated by the signal recognition unit 48, which resets a timer in its microprocessor and opens the above-described squelch if the squelch is employed and is closed.

The handset and the base station then set up traffic channels, and the traffic message is sent through a reverse traffic channel and is authenticated by the signal recognition unit 48, which resets the timer and sends a valid user code to the basestation.

The traffic message then continues with the user conversation, while the signal recognition unit 48 repeatedly authenticates the valid reverse code, resets the timer and sends the valid user code to the basestation.

When the conversation is terminated, the signal recognition unit 48 determines that there is valid reverse traffic or access code and, at the expiry of the time set by the timer, closes the squelch, if provided.

FIG. 15 shows the sequence of operation for a non-authorised user. In response to the detection of a user-initiated call or a page message or page response message, the signal recognition unit attempts to authenticate a valid access code and open the squelch, if it is closed and if it is provided.

The handset and basestation then attempt to set up traffic channels, and traffic message is initiated in the reverse traffic channel. However, the signal recognition unit is unable to authenticate any valid reverse or access code.

In a third situation, the handset moves into a coverage zone, i.e. the coverage zone of the signal recognition unit 48, after communication between the handset and the base station has been set up. The signal recognition unit 48 is initially unable to authenticate the reverse traffic code but, as the handset approaches, becomes able to do so and then resets its timer and opens the squelch. When the call is terminated, the authentication is discontinued and, when the timer expires, the squelch, if provided, is closed.

FIG. 17 illustrates the situation when the handset 42 moves out of the coverage zone of the signal recognition unit 48. Initially, a valid reverse traffic code is authenticated, and the timer is then reset and the valid user code, i.e. the handset identification signal, is being transmitted to the base station. This continues until the authentication no longer occurs, and then the squelch, if any, is closed on expiry of the timer.

We claim:

1. A method of operating a code division multiple access (CDMA) telephone system, which comprises the steps of:
   transmitting an upstream CDMA telephone signal incorporating a digitally encoded voice signal and handset identification from an operating CDMA mobile handset having an identification code to a basestation;
   said basestation having a coverage zone for exchanging upstream and downstream telephone signals with said handset and said handset being located within said coverage zone;
   detecting said upstream CDMA telephone signal at a signal detection location which is spaced from said basestation;
   processing said detected upstream CDMA telephone signal at said signal detection location to recognize said identification code of said handset and to provide an identification signal indicative of the identity of said handset; and
   transmitting said identification signal from said signal detection location to said basestation.

2. A method as claimed in claim 1, which includes monitoring the signal quality of the detected upstream signal and transmitting the identification signal to the basestation only when the signal quality of the detected upstream signal is found to be above a predetermined threshold level.

3. A method as claimed in claim 1, which includes storing, at said signal detection location, a plurality of codes identifying a plurality of mobile cordless telephone handsets as being authorized to exchange signals with said basestation and in which the processing of the upstream signal includes comparing said handset identification with the codes to determine whether said operating handset is an authorized handset and transmitting the identification signal only if said operating handset is thereby determined to be an authorized handset.

4. A method as claimed in claim 1, in which the transmission of said identification signal from said detection location is effected through a signal channel, provided with a squelch, to said basestation and in which said signal channel is squelched when no authorized handset is recognized at said detection location.

5. A method as claimed in claim 1, which includes transmitting said upstream signal from said signal detection location through a signal channel to said basestation and which also includes squelching the transmission of the upstream signal through said signal channel in the absence of the identification signal.

6. A method as claimed in claim 1, in which said upstream signal and said identification signal are passed through a signal conduit to said basestation and in which a downstream signal from said basestation is passed through said signal conduit to said signal detection location and broadcast as a radio signal from said signal detection location to said operating handset.

7. A method as claimed in claim 6, in which at least one of the upstream signal and the downstream signal is squelched in the absence of said identification signal.

8. A method as claimed in claim 1, which includes providing:
   timing and other data from the basestation to said signal detection location; and
   employing the timing and other data at said signal detection location to facilitate detection and recognition of the operating handset.

9. A code division multiple access (CDMA) telephone system, comprising:
   a CDMA mobile handset having an identification code for transmitting upstream CDMA telephone signals combining digitally encoded voice signals and handset identification;
   a basestation having a coverage zone for receiving said upstream CDMA telephone signals from said handset while said handset is within said coverage zone of said basestation; and
   a signal recognition unit for detecting and processing said upstream CDMA telephone signal and transmitting an identification signal identifying said handset to said basestation;
   said signal recognition unit being provided at a location having an identifying handset code which is spaced from said basestation.

10. A CDMA cordless telephone system as claimed in claim 9, wherein said signal detection unit includes means enabling transmission of the identification signal only when the upstream signal has a signal quality exceeding a predetermined threshold level for authorized signals.

11. A CDMA cordless telephone system as claimed in claim 9, wherein said signal recognition unit includes means for comparing said upstream signal with a plurality of identification codes identifying respective authorized handsets.

12. A CDMA cordless telephone system as claimed in claim 10, wherein said signal recognition unit includes means for comparing said upstream signal with a plurality of identification codes identifying respective authorized handsets.

13. A CDMA cordless telephone system as claimed in claim 10, wherein said signal recognition unit includes an upstream signal path for transmission of said upstream signal and a squelch provided in said upstream signal path and responsive to said signal processor so as to squelch said upstream signal until said handset identification code has been recognized by said signal processor.

14. A CDMA cordless telephone system as claimed in claim 13, wherein said signal recognition unit includes a downstream signal path for transmitting a downstream signal from said basestation to said handset.

* * * * *